Patented Aug. 20, 1946

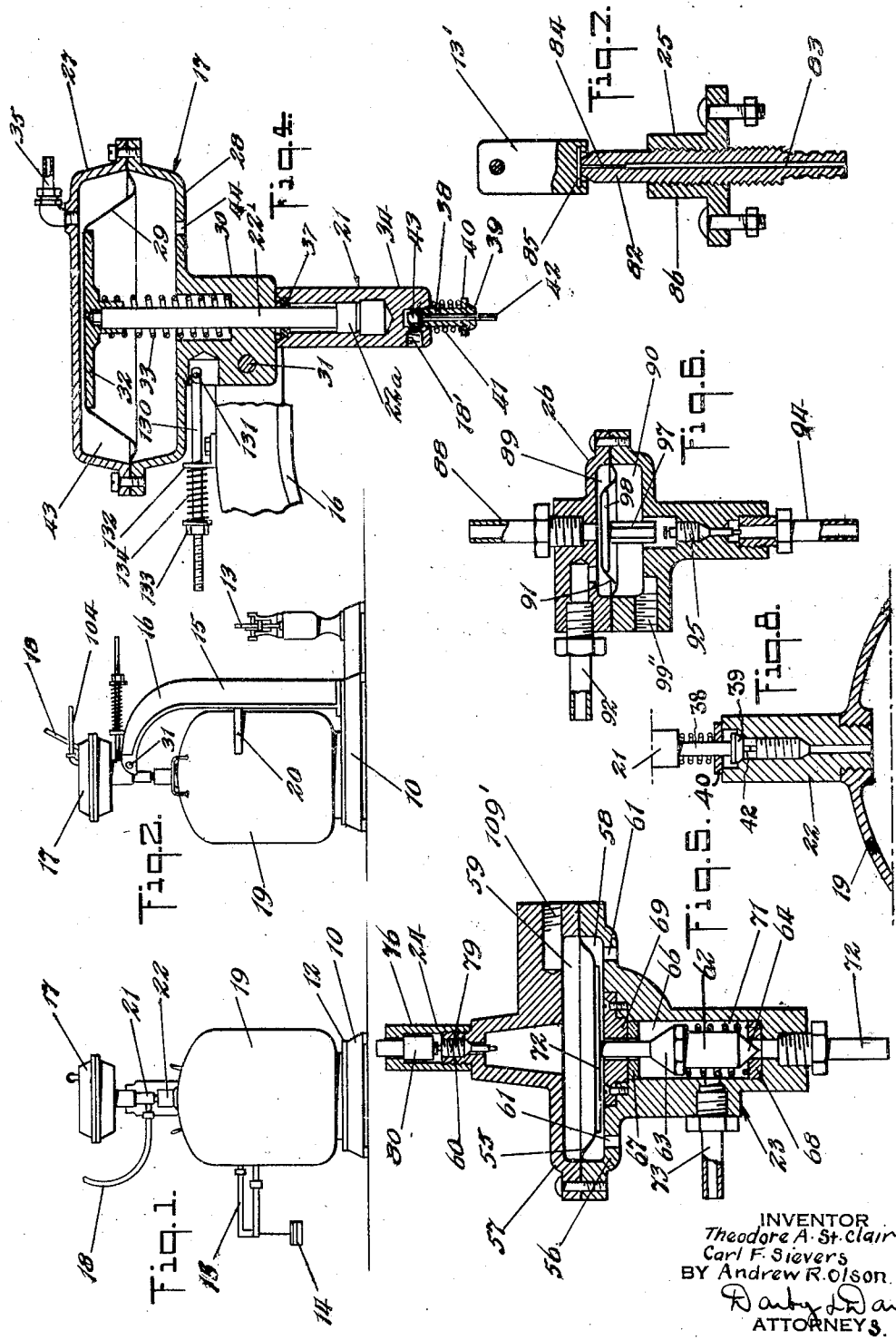

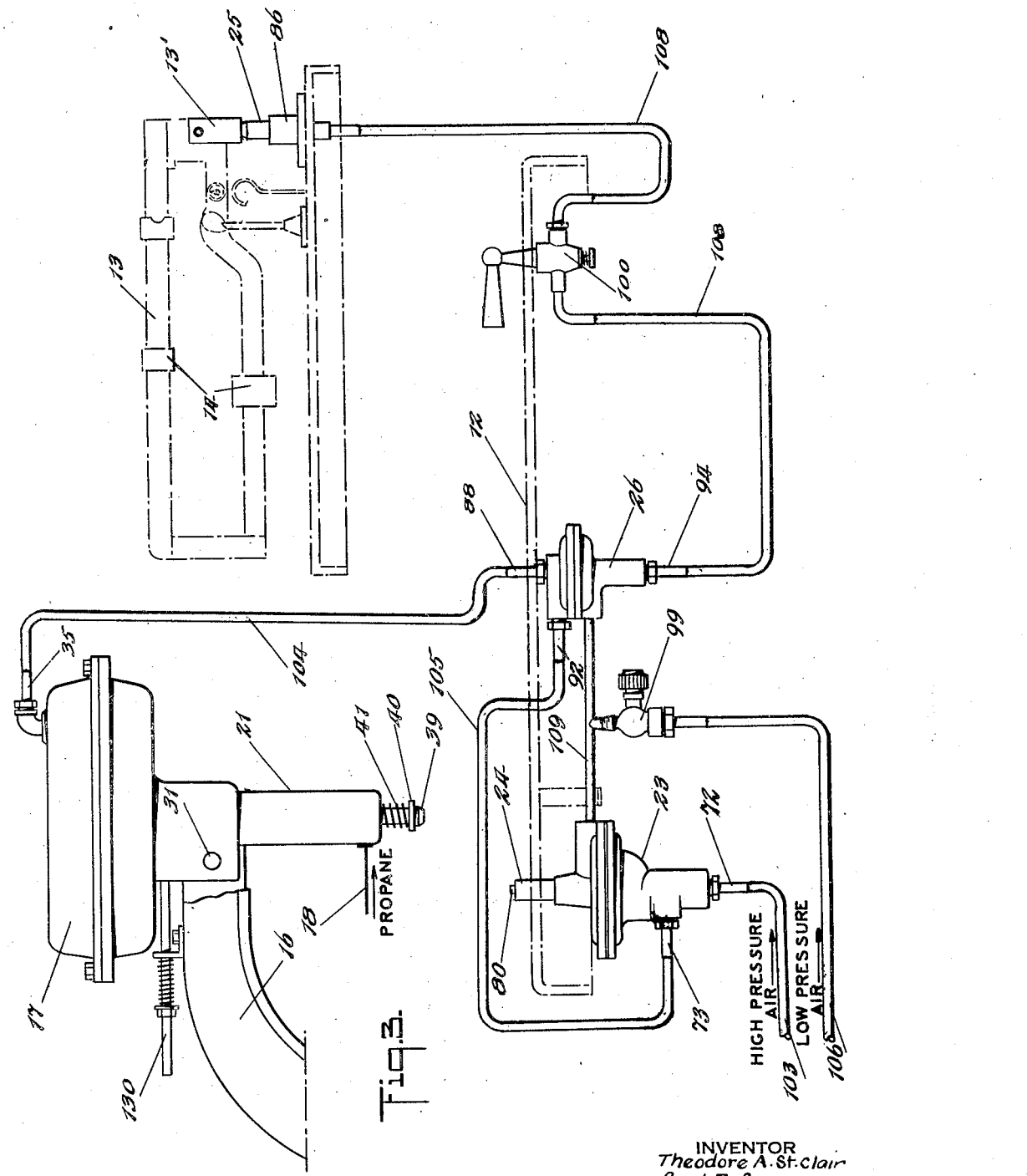

2,406,263

UNITED STATES PATENT OFFICE 2,406,263

AUTOMATIC CONTAINER FILLING DEVICE

Theodore A. St. Clair, Carl F. Sievers, and Andrew R. Olson, Bartlesville, Okla., assignors to Phillips Petroleum Company, a corporation of Delaware Application December 5, 1944, Serial No. 566,672

7 Claims. (Cl. 226—20.6)

This invention relates to an automatic mechanism for filling enclosed pressure vessels with a volatile liquid.

A more specific, detailed object of the invention is to provide a system which is completely automatic, and of special utility in filling liquefied petroleum gas cylinders. The use of these cylinders has been actively developed as a method of distributing propane for household heating purposes and involves the use of a small portable cylinder of about 20 pounds propane capacity. One such well known system is the "Philgas self-service system."

In the maintenance of such systems, it has been an important function thereof to provide facilities for refilling large numbers of these small cylinders daily, in order to meet the customers' requirements. The operation of filling the cylinders has in general, in the past, been done manually, and the labor cost involved in filling alone amounts to a considerable sum, which cost, of course, is reflected in the customers' price paid for such gas service.

In manually filling these cylinders, the operators have been required to place the cylinders individually on platform type scales, make connection manually between the charge line and the cylinder, set the scale beam to the desired weight, turn on the charging line, turn off the charging line when the cylinder has reached the correct gross weight, and disconnect and remove the cylinder. For the automatic system herein disclosed, the operator need only place the cylinders on the scales, establish a preliminary connection between the respective filling head and cylinder by a simple one hand manual operation, press a control button, go on to other work, and when the cylinder is automatically filled and the filling apparatus automatically disconnected and swung out of the way, return to merely lift the properly filled cylinders off each scale which has signaled that the cylinder on it is filled. The signal is given by the automatic tilting of the large area flat top or other portions of the filling head, which tilting occurs due to gravity upon said disconnection. A large number of these container filling devices may be used in rows in a single room with one man rapidly placing cylinders on the scales and pushing the starting button and picking up filled cylinders as automatically indicated, no judgment nor adjustment by the operator being needed. The scale beam can be set to a fixed weight at the start and never changed, as the cylinders plus their intended load always weigh substantially the same. The filling of the cylinders to a final predetermined weight is accomplished without conscious supervision by the operator, by reason of the use of an automatically operating device shutting off the flow of fluid and causing disconnection of the cylinder from the charging head, when the correct weight has been reached.

The system herein disclosed is related to and involves improvements upon a similar system disclosed in copending application Serial 448,022, filed June 12, 1942, for Automatic cylinder filling device.

One object of this invention is to provide a means for filling a container with a given weight of fluid.

Another object is to provide means connected with a container by an easy manual operation and easily actuated to automatically fill said container with a given weight of fluid and then automatically disconnect said container and signal that said container is filled.

A specific object of this invention is to provide a charging head and a power operator therefor by means of which a gastight connection with the cylinder is automatically effected.

A still more specific object of the invention is to provide a simplified and improved form of charging head and means for effecting cooperative association of it with the power actuating device.

Other and more detailed objects of this invention will be apparent from the following description of a complete embodiment.

This invention resides substantially in the combination, construction, arrangement and relative location of parts as will be described in detail below.

In the accompanying drawings,

Figure 1 is a front elevation showing the cylinder to be charged, the scales and associated parts;

Figure 2 is a side elevational view of the apparatus in Figure 1;

Figure 3 is a schematic diagram illustrating the association of the elements of the system of this invention and the operation thereof with all parts in elevation;

Figure 4 is a vertical, central, cross-sectional view through the charging head and power actuator;

Figure 5 is a vertical, central, cross-sectional view through the relay valve and actuating mechanism;

Figure 6 is a vertical, central, cross-sectional view through the valve which prevents undesired

recess in the nipple 38 is a threaded inlet passage 18' formed in the sleeve 34. Slidably mounted in the nipple is a valve stem 42 having mounted on its inner end a resilient valve member 43. The valve stem 42 fluted or longitudinally grooved provides for adequate flow of liquid past it from the passage 18' to the point of discharge at the end face of the head 39. The mouth of the counterbore in the sleeve 34 is closed by means of a washer 37, held therein in any suitable manner, as for example, by means of a snap ring, forming a stop against which the enlarged head 22ᵃ engages when the charging head unit slides under its own weight on the push rod 22', as it is free to do when released.

The relay valve and associated equipment is shown in Figure 5. It includes a housing comprising the parts 56 and 57, which are secured together in sealing relation with respect to the periphery of a flexible diaphragm 55, dividing the adjacent portions of the housing into the lower compartment 58 and the upper compartment 59. The lower compartment is normally vented to atmosphere through several ports 61. Pressure fluid is supplied to the compartment 59 through the threaded passage 109'. The upper housing part 57 is provided with a projection terminating in a threaded boss 60, having a passage therethrough, in which is mounted any suitable form of valve which is normally held closed by means of a spring built therein. This valve is of the same type as is commonly used in the adapter 22 of the cylinder 19, and is of the so-called tire valve type, fully disclosed in United States Patent No. 2,172,311. A thimble 76 is threadedly mounted on the boss 60 and serves to house a push button member 80, around which pressure fluid may escape to the atmosphere when this member is depressed to open valve 79, as will be described again later. The housing part 56 has a depending extension, with a passage therethrough of several different diameters. The portion of largest diameter forms a compartment 66 in which a two-way valve member 62 may operate. This member has a valve 64 at the lower end, and a valve 63 at the upper end. The valve 64 cooperates with a resilient seat 68, controlling the flow of fluid from a pipe in communication with the connector 73 opening into this chamber and a pipe in communication with the connector 72. A compression spring 71 normally urges the member in a direction to unseat the valve 64. The upper end of the compartment 66 is closed by a removable plate 69 to which is attached a resilient valve seat 67, overlying the area of the plate forming the end wall of compartment 66. The resilient washer 67 is attached to plate 69 in any suitable manner, as by cementing, vulcanizing, or otherwise. The valve member 62 is of hexagonal or other cross-sectional shape at the area forming the seat for the upper end of spring 71 so as to provide passages therearound. The valve member 62 has a stem attached to a backup plate 72 engaging the lower face of the diaphragm 55.

The mechanism for preventing repetition of the recharging operation, or a tendency to repeat the operation when a cylinder is filled and being removed from the scales is shown in Figure 6. It comprises a housing having upper and lower parts, secured together, and clamping between them in sealing relation a flexible diaphragm 91. The diaphragm 91 divides this housing into the upper compartment 89 and the lower compartment 90. Communication with the upper compartment is established by means of pipes connected to the fixtures 92 and 88. Communication with the lower compartment 90 is had through the threaded port 99". Cemented or otherwise secured to the diaphragm 91 is a backup plate 98 having a fluted extension 97 extending downwardly to provide a flow passage therearound. This extension is adapted to cooperate with a normally closed spring loaded tire type of valve assembly 95, such as disclosed in the above mentioned patent. This valve controls a passage in the lower part of the housing to which is connected a pipe, as will be explained later, by means of the adapter 94.

The scale beam actuated valve is shown in Figure 7. Pivotally attached to the beam, as will be seen from Figure 3, is a valve member 13' having mounted therein in a suitable manner, a resilient seat 85. This seat cooperates with a nozzle 82 having a bore 83 of larger diameter than the restricted bore 84 in communication therewith, and opening at the seating face or end of the nozzle 82. This nozzle is mounted at any convenient part of the scales, by means of a fixture 86 having a threaded engagement therewith for longitudinal adjustment with respect to the valve disc 85.

The system is shown in Figure 3. A pipe 103 establishes communication from any suitable high pressure source to the relay valve through the connector 72. A suitable pressure for this source is of the order of 8 pounds per square inch, and of course, the line 103 may include a suitable shut off valve. Low pressure air from another source, having a pressure of the order of 2 pounds per square inch, is supplied to an adjustable needle valve 99 through the line 106, which likewise may include a shut off valve, if desired. The discharge end of the needle valve 99, which may be of any suitable construction, is connected by a pipe 109 to the threaded passage 109', of the relay valve assembly 23, and to the threaded passage 99" of the element 26. The connector 73 of the relay valve is connected by pipe 105 to the connector 92 of the element 26. The connector 88 of this element is connected by pipe 104 to the connector 35 of the power actuator. The connector 94 of the element 26 is connected by pipe 108 to the nozzle tube 82, and includes an emergency shutoff valve 100 of any suitable construction. The liquid propane supply source, not shown, is connected by the line 18 to the port 19' of the charging head, and this line may include a suitable shut off valve, as will be obvious.

In the operation of this system an empty cylinder 19 is placed on the loading platform and properly positioned, as previously described, so that its valved adapter 22 is in position to be engaged by the charging head, when the power unit is pivoted clockwise (as shown in Figure 2) about its supporting pin 31 from an inactive rest position to an intermediate active position. As this operation takes place the conical seating head 39 is moved into the adapter 22, and the spring loaded washer 40 engages on the end face of the adapter (see Fig. 8). It will be understood that at this time spring 33 of the power unit holds the parts controlled thereby in the position shown in Figure 4, and that the sleeve 21 will have slid down on the push rod 22', so that its head 22ᵃ engages the under face of the washer or closure member 37. Thus as the power unit is moved into position the sleeve 21 may have relative movement on the push rod 22' by sliding thereon towards the extension 30. Valve 43 is held closed by the pressure of the liquid propane on the resilient valve member 43. Pipes 18 and 104 are preferably flexible hose so as not to unduly restrain the movements of the power unit.

It is assumed, of course, that high and low pressure is being supplied to the apparatus by the lines 103 and 106 respectively. High pressure air flows up to the closed valve 64 which is held closed in the following manner. Low pressure air bleeds through the needle valve 99 and the branch pipe 109 so as to create such a pressure in chamber 59 of the relay valve and chamber 90 of the control element 26 (Fig. 6) as to hold valve 64 seated against the resistance of spring 71, and to hold diaphragm 91 in the position shown in Figure 6, so that the actuator 97 for the valve 95 is out of engagement therewith. As previously stated, valve 95 is normally closed by means of a spring built into it. It is also helpful to note that with the empty cylinder 19 on the platform 12, the scale beam 13, due to the adjustment of the weights 14 thereon, will be in such position as to cause the valve disc 85 to disengage the end of the nozzle 82. Thus, with the parts in this position it will be seen that low pressure air is trapped in chambers 59 and 90.

To begin filling the cylinder 19 the operator momentarily depresses the finger button 80, opening the normally closed valve 79 (Fig. 5), and venting chamber 59 to atmosphere around the finger button. In view of the presence of the needle valve 99 in the low pressure supply line 106, it will be seen that the pressure in chamber 59 quickly falls to atmospheric pressure, or substantially so, since the flow capacity around the finger button 80 is greater than the flow capacity of the adjusted needle valve 99. The reduction of pressure in chamber 59 allows spring 71 to unseat valve 64 and seat valve 63 against the resilient seat 67. Thus communication is established between the high pressure line 103 and line 105 supplying high pressure air to chamber 89 in the element 26 through the line 105. As a result diaphragm 91 moves downwardly and the valve actuator 97 opens valve 95, establishing communication between line 109 and line 108 which is now open to atmosphere through the restricted port 84. Thus low pressure can escape to atmosphere and not build up a pressure in chamber 59 even though the push button 89 is only momentarily actuated, and as a result valve 79 is only opened for a short time. The high pressure air also flows from compartment 89 through line 104 into the power device 17, building up pressure in the chamber 43 (Fig. 4) and causing diaphragm 95 to move downwardly. This movement of the diaphragm carries the push rod 22' downwardly until it engages the end of the counterbore in the sleeve 34, after which it causes this sleeve to move downwardly compressing spring 41 and causing the conical head 39 to engage in the cooperating seat of the adapter 22 on the cylinder 19 (see Fig. 8). As this movement continues, the valve stem 42 engages the stem of the tire valve in the adapter 22 so that full downward movement of the sleeve 34 causes valve 43 to unseat and engage the upper end of the valve compartment it is in, whereby further downward movement of sleeve 34 is transmitted through valve 43 and stem 42 to the stem of the tire valve in the adapter 22 forcing said tire valve into open position, thereby establishing communication between the empty cylinder 19 and the propane liquid supply line 18. The cylinder begins to fill and during the period of filling all of the parts remain in their operated position, as described.

When the cylinder is filled with liquid in the proper amount, as determined by the adjustment of the weights 14 on the scale beam 13, the scale beam will move in a clockwise direction (Fig. 3) until the valve disc 85 (Fig 7) closes the restricted port 84, interrupting the escape of low pressure air to the atmosphere. As a result, pressure builds up in the compartment 59 of the relay valve 23, closing valve 64 against the action of spring 71. Compartment 58 of the relay valve being vented to atmosphere through the port 61 does not interfere with this operation, and any high pressure air that escapes past the now open valve 63 during this transitional period can also escape to atmosphere so as not to create any pressure in compartment 58 on the underside of the diaphragm 55. Thus valve 64 is properly closed cutting off the supply of high pressure air from line 103 through line 105 to compartment 89 of the element 26, and hence, interrupting the supply of air under pressure in the upper face of diaphragm 29 in the actuator 17. Pipes 105 and 104, and chamber 89 are vented to atmosphere past the valve seat 67 and the port 61, in an obvious manner. Pressure can therefore build up under diaphragm 91 raising the actuator 97 for valve 95, and permitting it to be closed by its spring. The venting of chamber 43, in the power actuator, to atmosphere through line 104 allows compressed spring 33 to raise the actuator rod 22' whose enlarged head 22ª engages the shoulder between the counterbore sections in the sleeve 34, due to a clockwise torque (as seen in Fig. 4) around pivot 31 (caused by the center of gravity of 30 being to the right of, and thereby having an effective lever arm around the pivot 31) which torque always causes said engagement, so that the sleeve is raised upwardly, disengaging the valve stem and actuator 42 from the tire valve in the adapter 22 so that the pressure of the liquid propane on the valve 43 can seat and seal it. Thus the supply of propane to the cylinder 19 is cut off. At the same time the power actuator 17 is de-energized and spring 33 kicks the charging head 34 upwardly until it clears adapter 22 of cylinder 19. The power actuated unit 21 then swings head 34 back out of the way under 19 automatically due to gravity and the offset pivot 31. The position of actuator 17 serves as a signal to show that the cylinder 19 is filled and is disconnected. Cylinder 19 may be removed and a new empty cylinder replaced starting the cycle over again. The sleeve 34 is then manually moved so that the enlarged head 22ª may slide up into the reduced portion of the counterbore and reset the charging head for the next operation which, of course, is repeated for each cylinder to be filled.

The valve 100 is merely provided to shut off the low pressure air leakage through the nozzle 82, if at any time during the filling of a cylinder, it is desired to interrupt the filling thereof. The result of the closing of valve 100 is exactly the same as the closing of the restricted passage 84 in the nozzle.

From the above description it will be apparent to those skilled in the art that the subject matter of this invention is capable of some modification, and embodiment in other physical forms, without departure from the novel subject matter and scope thereof, and we do not, therefore, de-

What is claimed is:

1. A device as described comprising a sleeve having a seating member, a valved passage in said sleeve and seating member, an actuator for said sleeve having a push rod slidably connected to said sleeve, and a spring for normally holding said rod in retracted position.

2. In the combination of claim 1, said actuator being pressure fluid operated having a member connected to said push rod for moving it into pushing engagement with said sleeve.

3. In the combination of claim 1, said sleeve having a passage therein forming a shoulder and said push rod having an enlarged head operating in said passage for engagement with said shoulder.

4. In the combination of claim 1, said actuator being pressure fluid operated, said sleeve having a passage forming a shoulder, and said push rod having an enlarged head for operation in said passage and engaging said shoulder upon de-energization of said actuator.

5. In an apparatus for filling containers with fluid under pressure, the combination including a fluid supply line, a charging head constructed to effect sealing engagement with a container to be filled, said charging head including a valve connected to said supply line and normally closed by the pressure of the fluid therein, a power actuator for moving said charging head into sealing relation with the container to be filled, means for pivotally supporting said actuator, and resilient shock absorbing means for restraining the movement of said actuator in the sealing direction of said charging head.

6. A charging head for filling containers with fluid under pressure, comprising a power actuator having a push rod, a sleeve slidably mounted on said push rod, a passage in said sleeve, a nipple mounted in said passage, a valve member cooperating with said nipple to normally close said passage under the pressure of fluid therein, and a spring biased engaging member mounted on said nipple.

7. In the combination of claim 6, said sleeve having a counterbore of different diameter to form a shoulder and said push rod having an enlarged head engageable with said shoulder.

THEODORE A. St. CLAIR.
CARL F. SIEVERS.
ANDREW R. OLSON.